DATA PROCESSING APPARATUS

Filed Aug. 17, 1961 7 Sheets-Sheet 1

HEINZ M. ZEUTSCHEL
INVENTOR.
BY David A. Rich
ATTORNEY.

HEINZ M. ZEUTSCHEL
*INVENTOR.*

BY David A. Rich

ATTORNEY.

April 13, 1965 H. M. ZEUTSCHEL 3,178,178

DATA PROCESSING APPARATUS

Filed Aug. 17, 1961 7 Sheets-Sheet 3

HEINZ M. ZEUTSCHEL
*INVENTOR.*

BY David A. Rick

ATTORNEY.

HEINZ M. ZEUTSCHEL
*INVENTOR.*

BY David A. Rich

ATTORNEY.

HEINZ M. ZEUTSCHEL
*INVENTOR.*

BY David A. Rich

ATTORNEY.

DATA PROCESSING APPARATUS

Filed Aug. 17, 1961 7 Sheets-Sheet 6

HEINZ M. ZEUTSCHEL
*INVENTOR.*

BY David A. Rich

ATTORNEY

DATA PROCESSING APPARATUS

Filed Aug. 17, 1961

7 Sheets-Sheet 7

HEINZ M. ZEUTSCHEL
*INVENTOR.*

BY David A. Rich

ATTORNEY.

3,178,178
DATA PROCESSING APPARATUS
Heinz M. Zeutschel, Arlington, Mass., assignor to Itek Corporation, Lexington, Mass., a corporation of Delaware
Filed Aug. 17, 1961, Ser. No. 132,115
9 Claims. (Cl. 271—74)

The present invention relates to data processing. More particularly, the invention relates to a data processing system for transporting, locating, segregating, retrieving and reading of data bearing media. More especially, the invention relates to handling of data bearing media including graphic data bearing cards or chips, such as photographic data, having predetermined identification coding. The term "data bearing medium or media" as used herein includes data bearing bodies, such as film chips, cards and sheets, and the frame carriers to support the bodies. The term further includes such a body integrally formed with a carrier means $x$ and so formed as to provide its own carrier.

The present invention presents an improvement over a copending application filed by William Gordon Welchman assigned to the same assignee, entitled "Data Processing Apparatus" filed on June 23, 1960, Serial No. 38,334, now Patent No. 3,134,895. The data processing system illustrated in that application generally provides a pneumatic driving system for propelling data bearing media such as data bearing sheets, cards or chips. The system permits data bearing sheets to be isolated in view while still wholly within the system as well as enabling the retrieval of an individual sheet for subsequent use. It is contemplated that the data bearing sheets may be in the form of paper, metal, or plastic film or cards. Each sheet may carry recorded data plus an identification code, for example, magnetic or optical coding for distinguishing it from other similar sheets. In that system, the sheets may be separated as they travel along a guide rail system for individual scanning to identify a desired sheet. Segregated sheets may be directly viewed or projected without extraction from the system. In that system a data bearing sheet is provided with a magnetically recorded binary type identification code striping adjacent an edge. A magnetic sensing unit is provided for sensing or reading the code on each sheet as the sheet passes a preselected location. Means for stopping the flow of media along a given path are provided to control the motion of and isolate a selected chip.

In the copending application the system is adapted to handle sheets by subjecting them to a fluid pressure gradiant and transporting sheet cards or chips along a guide rail system. The individual sheets preferably contain four notches to receive the rails and to be slidably supported by them.

Cooperating with the magnetic sensing head is a coincidence logic system. This system receives the signals produced by the head, responds to identification code on the sheet and compares the signals with a desired program signal to produce an output control signal. The output control signal controls other mechanisms for using or disposing of the sheets in a desired manner.

In the system of the copending application, certain problems have become identified for some of the more important processes. It is, for example, highly desirable to be able to read the face of a sheet traveling along in its own plane and to have the flexibility necessary to transport the sheet at an oblique angle relative to its direction of motion. This flexibility is not available in the prior copending system.

The prior art copending system is limited in its ability to sort out individual sheets in accordance with preselected characteristics. To accomplish this end, it is preferable to introduce a switching control at a single preselected location which then predetermines the path of motion of a selected data bearing sheet.

In a complicated distribution system it is frequently desirable for the chip which moves along the guided path to cross over or intersect other paths. For track rails, this crossover problem becomes very complicated unless some form of switching is introduced. It is highly desirable to be able to control the motion of a data bearing sheet or chip in such manner as to cross over other paths of motion without interference.

In the prior art there are other data processing systems which have been devised for the handling of data bearing cards. Systems of the type manufactured and sold by the International Business Machine Company are limited to printed and punched cards.

A number of systems have been devised which employ jets or streams of air for removing and segregating successive data bearing sheets. With the exception of the above noted copending system, the prior art pneumatic systems more generally employ jets or streams of air to perform a flipping rather than a transporting function.

Prior art pneumatic data processing devices embody the idea of anchoring film chips, for example, to a movable support such as a rotary drum or an elongated magazine or stick. A movable support or magazine carries the film chips past a sensing stage where a transducer is located to read an identification code carried by a chip. Cooperating with the movable support in such devices is a jet or stream of air directed at the stack of chips. The air jet is so arranged as to cause each chip to flip past the transducer or reading head. Thus, such air jets function to segregate each chip for a short interval of time from the remaining chips to enable a scanning or reading function. Having detected a chip with a desired code, additional means are necessary to stop the chip and project its information on to a screen for viewing or to extract the chip from its stack.

In the past, the speed at which the chips move past the sensing head is such that a data bearing chip could not be stopped at a desired spot for viewing but tended to over-travel. In some cases the over-travel is so great that a relatively large number of additional chips travel past the sensing stage and collect on top of or in back of the desired chip. Thus, a back-tracking mechanism is required to back-track the additional chips in order to isolate the desired chip for viewing or reproduction. The comparatively slow isolation run is done at the expense of the over-all speed of the machine. The anchoring of chips in the prior art devices greatly limited the ease with which individual chips could be extracted from the system.

In contrast with the above, the system of the present invention provides a guide and transport mechanism for transporting data bearing media without the limitations of these prior art devices. The problem of sorting and distribution is greatly simplified in the present invention while maintaining the flexibility of switching, recycling, extraction and retrieval of individual sheets. The present invention provides methods, apparatus, systems and data bearing media which retain the advantages of the above-mentioned prior art copending system over anchored devices. In addition, the invention presents an improved capability simply and flexibly to control sheet orientation switching, path cross-over and many other advantages.

It is, therefore, an object of the present invention to provide an improved data processing apparatus and system for transporting, locating, segregating, retrieving and reading data bearing media.

A further object of the invention is to provide an improved data processing apparatus capable of transporting a data bearing medium in its own plane.

Another object of the invention is to provide an improved data processing apparatus capable of selecting a desired data bearing medium at a given location for transportation along a selected predetermined path from among a plurality of such paths.

A still further object of the invention is to provide an improved data processing system capable of changing the orientation angle of a data bearing medium relative to its direction of motion.

Yet another object of the invention is to provide an improved data processing system capable of rotating a data bearing medium about an axis.

Yet another object of the invention is to provide an improved data processing system having improved means for recycling data bearing media.

Still another object of the invention is to provide a data processing system having an improved transport means for transporting a data bearing medium around corners.

A still further object of the invention is to provide an improved data processing system having improved means for inter-mixing data bearing media.

Still another object of the invention is to provide an improved data processing apparatus wherein a data bearing medium in motion may readily cross the path of another medium without interference.

A still further object of the invention is to provide an improved data processing apparatus wherein the motion of one part of a data bearing medium may be controlled independently of another part of the medium, thus providing improved flexibility for sorting, transporting, retrieving, and reading data bearing media.

In accordance with the invention there is provided a data bearing medium. The medium comprises a carrier means having engagement means extending beyond a pair of opposite boundaries of the medium for engaging a channeled transport means adapted to propagate the medium along a channeled track. A data bearing body is carried by the carrier means. In the preferred embodiment the medium includes a visual data bearing rectangular sheet. In one form of the invention the medium is a photographic film sheet with two pairs of spaced, substantially co-planar tab extension means. In another form of the invention a pair of parallel spaced cylindrical rods are affixed to the medium and provide two pairs of oppositely disposed tab extension means. In still another form of the invention, the engagement means extend from all four edges of the medium. In still another form of the invention, the medium has two pairs of spaced notches for engaging a transport means adapted to propagate the medium along a plurality of elongated, parallel track rails.

Further in accordance with the invention, there is provided a data processing system for a data bearing medium. The medium has engagement means extending beyond a pair of opposite edges. The system includes an open-guide system having transport means with a plurality of parallel, spaced track channels to receive the engagement means for guiding the medium along the track channel. Driving means are coupled to the transport means for propelling the medium along the track channel. In one form of the invention, fluid driving means are provided for propelling the medium in response to fluid flow. In another form of the invention, coded data bearing sheets are provided. Identification sensing means are coupled to the guide system for reading the coded sheets. In still another form of the invention, the channels are so disposed as to maintain the medium at an oblique angle relative to its direction of motion along the guide system. The channels are preferably disposed in opposed parallel planes. In still another form of the invention, the channels are disposed co-planar and, at least in part, so disposed adjacent the opposite edges of the medium as to enable its motion in its own plane.

In another form of the invention, at least two of the channels intersect in the same plane to enable the medium to cross track channels when in motion.

In yet another form of the invention, the channels are arranged in two pairs disposed in opposing parallel planes adjacent opposite edges of the medium. The spacing between the members of each of the channel pairs is so chosen as to guide the sheet along the channels only at an oblique angle thereto.

In still another form of the invention the data bearing medium have encoded indicia and edge guide extension tabs extending from a pair of opposite edges of the sheet. The guide system includes a transport means having a plurality of parallel, spaced track channels adapted to receive the tabs. The channels are so disposed as to accept and slidably support the sheet only when the sheet is oriented at a selected oblique angle relative to the channels. Fluid driving means are provided for producing an air stream having a flow path for separating successive sheets from a stack of sheets and propelling the successive sheets one by one along the channels past a preselected location. Identification sensing means are coupled to the guide system and are disposed at a selected location for scanning the encoded indicia and producing an output representative of the encoded indicia.

In still another form the invention acceleration means are coupled to the guide means for selectively adjusting the velocity at one edge of the medium relative to its opposite edge. In this manner, the medium may be caused to travel along a selected predetermined path.

Still further in accordance with the invention, there is provided a data processing apparatus. The apparatus comprises a plurality of planar data bearing media, each having engagement means extending from a pair of opposite edges of the medium. An open guide system is provided. The system includes a transport means which has a plurality of parallel, spaced track channels to receive the engagement means for guiding the medium along the track channels. Driving means are coupled to the transport means for propelling the medium along the track channels.

For better understanding of the present invention, together with other and further objects thereof, reference is made to the following description taken in connection with the accompanying drawings, and its scope will be pointed out in the appended claims.

DESCRIPTION OF THE INVENTION

Figures 1, 2:
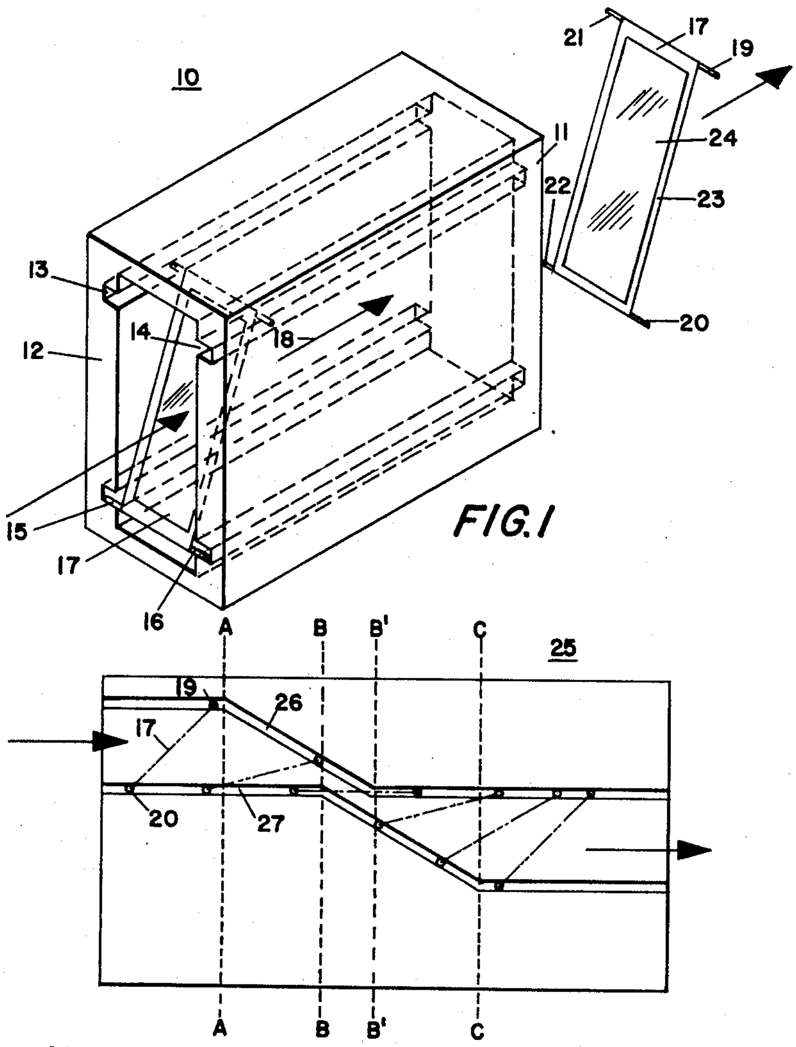
FIG. 1 is a perspective view of a transport apparatus illustrating an aspect the present invention.
FIG. 2 is a side, schematic view of a transport apparatus illustrating another aspect of the invention.

The invention is concerned with data processing including the ordering, presentation and use of data in various physical forms including graphic data. More particularly, the present invention is directed to systems, methods and apparatus for handling data bearing media carrying visually presented or graphic information, as well as abstract digital or analogue information for use in machines. Of particular concern is the handling of of discrete information elements such as film cards or film chips. Such data processing systems require techniques for converting an information file into discrete elements, transporting each such discrete element from a file to a point of detection, then to a point of switching and finally to a point of readout, either visually or by machine.

The invention includes methods and apparatus for handling data bearing bodies such as small unmounted film chips as well as large sections of film called herein "film cards" to distinguish them from the small unmounted "film chips." The handling of the larger film cards preferably involves a supporting carrier frame in addition to the film in itself. The frame is used as a carrier and can therefore carry a number of types of data bearing bodies.

The chip or card may provide its own support or carrier means.

Data bearing cards, such as aperture cards or punched cards, for example, can be used equally well as a carrier for photographic film chips or cards. The media may be coded to provide inherent control of selection, distribution, recycling etc. For various applications, magnetic coding, optical coding, and mechanical coding, such as provided by notches, are useful. A magnetic striping adjacent an edge of a carrier or data bearing body is highly desirable for edge scanning to identify a desired medium rapidly. Since a photograph contains an enormous amount of information per unit area, it is frequently desirable to utilize optical coding on the face of a data bearing body or its carrier combined with magnetic, mechanical or electrical coding adjacent an edge.

Sections of guide panels have track channels formed in them to receive e.g., for extension tabs from a data bearing medium such as a film card and carrier frame. The medium is propelled along the track channels and is normally inclined at an angle of approximately 45° to the track. The medium is free to move in either direction along the track channels. A number of media may be stacked in a section of track channels. Each medium may be driven along the track channels by an air stream. In this manner there is no problem with friction between the surfaces of film cards mounted on adjacent carriers. For a given system, sections of track channels are joined for various functions. Means may be provided for trapping and holding an individual medium.

The medium is transported to and stored in various types of bins, each of which includes a basic section of track channels. The bins may be permanently mounted for some purposes. In other applications, it is desirable for the bins to be removable. The bins are so constructed as securely to hold the carriers in place. The bin is adapted for insertion into an automatic system with, for example, air stream propulsion or for insertion into a manually controlled, carrier handling unit for use as a local file.

A principal advantage of the invention lies in the ability to merge or intermix input media from a plurality of input channels. This advantage derives from the use of track channels for guiding the media. The rate at which the cards are introduced is controlled in order to obtain a desired ordering of cards.

Switching from one track to another is obtained, for example, with relay control. The invention is particularly applicable to automatically controlled, high-speed switching operations. The independence of control over an edge of the carrier relative to its opposite edge greatly enhances the switching capability of a system embodying the invention. Switching is further enhanced by virtue of the ability of the system to transport carriers around right angle corners.

While it is normally desirable to transport film cards oriented at an angle relative to the track, for many purposes it is necessary to move or hold the medium in its own plane. Special sections of track channels can be provided to convert the orientation of the medium from inclined plane motion to motion in its own plane or any angle in between. For static viewing, contact printing or readout, the system is adapted to trap and hold a selected medium in its own plane. The medium may be moved in its own plane for viewing of its various parts. The system is further adapted to initiate motion of the medium along the track channels for propulsion by a fluid drive means.

The system contemplates a launching device for launching carriers either singly or in groups into position for propulsion by a fluid drive means. One such system uses a double belt preseparator air drive and toothed release wheel.

Recirculation is obtained by combining selected sections of track channels and properly directing fluid drive means to provide, for example, a suitable air stream operative at all points along a desired path. The ability to merge or intermix media is incorporated in the recirculation system.

Magnetic edge coding greatly enhances the speed and ease with which an individual medium may be identified and selected. A strip of retentive magnetic material is attached along the surface of the medium adjacent to an edge. Magnetic coding is provided by recording signals having relative positive or negative magnetic polarity at right angles to the edge. The code can be sensed while the medium is moving at high speed and at any angle. A magnetic sensing head is located adjacent a section of track channel. A coding system as used herein requires a definite signal. Absence of a definite magnetic signal where such a signal should be present indicates a defect and produces rejection of the medium. The present system contemplates the use of serial readout identification code indicia which greatly simplifies the related logic circuitry for interrogation and recognition.

*Description and explanation of the transport apparatus in FIG. 1*

Referring now in more detail to the drawings and with particular reference to FIG. 1, there is here illustrated a transport apparatus embodying the invention. The data processing system of the invention operates with a data bearing medium having engagement means extending from a pair of opposite edges of the medium. A transport apparatus is included in an open guide system. The transport apparatus has a plurality of parallel, spaced track channels to receive the engagement means for guiding the medium along the track channels.

As shown in FIG. 1, an open guide system is generally indicated at 10. The system includes a transport apparatus with a pair of side supporting members 11 and 12 which have four channels 13, 14, 15 and 16 formed therein. A data bearing medium 17 is propelled along the track channels 13, 14, 15 and 16, in response to a suitable drive means. The medium 17 is here shown as propelled along the track channels by fluid drive as provided by the thrust of a moving body of air. The air directs the medium 17 in the direction indicated by the arrow 18.

The medium 17 includes a carrier and data bearing body. The medium 17 has four extension tabs 19, 20, 21 and 22 extending from a pair of opposite edges in oppositely disposed pairs. The tab extensions as shown in FIG. 1 are provided by a pair of parallel, spaced cylindrical rods included as part of a carrier. Here a carrier 23 is formed from a lattice of supporting members from a paper like material wrapped around the cylindrical rods. A data bearing body 24 such as a photographic film chip or card is supported by the carrier 23. The body 24 may be a photograph and bear optical code data, written materials or graphic digital information for use in further data processing operations.

The track channels 13–16, inclusive, are so disposed in pairs in parallel spaced relation and in oppositely disposed planes as to maintain the medium at an oblique angle relative to its direction of motion along the guide system. For a medium with its extension tabs 19 and 20 spaced three inches apart, for example, the coplanar channels 14 and 16 are spaced 2⅛ inches apart to maintain the card 17 at an oblique angle of approximately 45° relative to its direction of motion.

In operation, a medium 17 is inserted with its extension tabs engaging the channels and propelled along the open guide system by the moving body of air.

*Description and explanation of the transport apparatus in FIG. 2*

Referring now to FIG. 2, there is here illustrated an open guide system adapted to convert the orientation of the medium while in motion from an oblique angle to motion along its own plane. The tracks as shown in FIGS. 2–12 are depicted schematically. Here the channels are in parallel spaced relation for a distance and then tend to converge for a distance, then to diverge, and finally return to parallel relation.

Thus, there is here shown an open guide system generally indicated at 25 with a pair of track channels 26 and 27. A data bearing medium 17 is shown in its several positions as propelled through the guide system in response to the flow of air. The medium is supported at its opposite edges by four track channels. The medium 17 tends to follow the initial direction provided by the parallel spacing between the channels 26 and 27.

When the upper edge of the medium 17, as shown, reaches the dashed line A—A, where the channel 26 changes direction and converges toward the channel 27, one edge of the medium 17 is accelerated relative to the other. The momentum of the card tends to drive the upper edge at a faster rate along the converging channel 26 than the lower edge along the channel 27. This continues until the channels become collinear, the momentum of the medium producing a motion along its own plane. This motion continues until the tab 20 of the medium 17 reaches the dashed line B—B where the lower channel 27 diverges from the upper channel 26. The lower edge of the medium travels along the channel 27 and is effectively accelerated relative its upper edge until it reaches the dashed line C—C, where the two channels 26 and 27 again become parallel spaced. Under the continued influence of the fluid drive, the medium 17 is then propelled at its preferred normal oblique angle along the parallel channels 26 and 27.

It will be apparent that a conversion of this character cannot take place without complicated switching apparatus in the system disclosed in the above mentioned copending application. In the prior art system disclosed therein, the open guide system includes a four rail transport engaging the card at notched intervals. The rail and notch principle is incompatible with motion of the card in its own plane.

A plurality of media may simultaneously be propelled through the system. Because of the open guide system, air travels around each medium and flows to the next. The spacing between media is chosen to prevent undesirable concentrations or "pile-ups." The system includes selectively disposed sources of fluid to control the motion of a plurality of media passing through the guide system simultaneously. In addition, it may be desirable to use means other than fluid means for transporting the medium through some portions of the system. For example, it may be desirable to use belts and pulleys to move the medium in its own plane.

Figure 3:
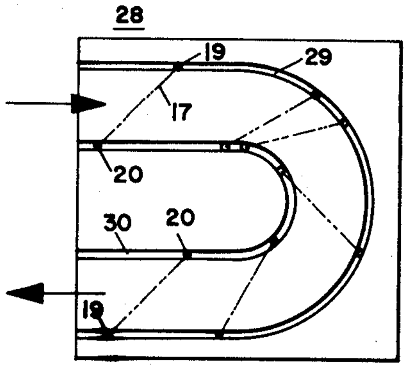
FIG. 3 is a side, schematic view of a transport apparatus illustrating still another aspect of the invention.

*Description and explanation of the transport apparatus in FIG. 3*

Referring now to FIG. 3, there is here shown an open guide system generally indicated at 28 having curved coplanar track channels 29 and 30 formed in the side supporting members. The modified apparatus shown in FIG. 3 particularly illustrates the ability of the medium to rotate about an axis defined by either pair of oppositely disposed tabs. At the same time the transport apparatus, as shown herein, points up the ability of the card to travel in a curvilinear path. This capability is particularly useful for recycling purposes. Note that the relative positions of the tabs 19 and 20 in the lower track section are reversed relative to their positions in the upper track portion.

Figure 4:
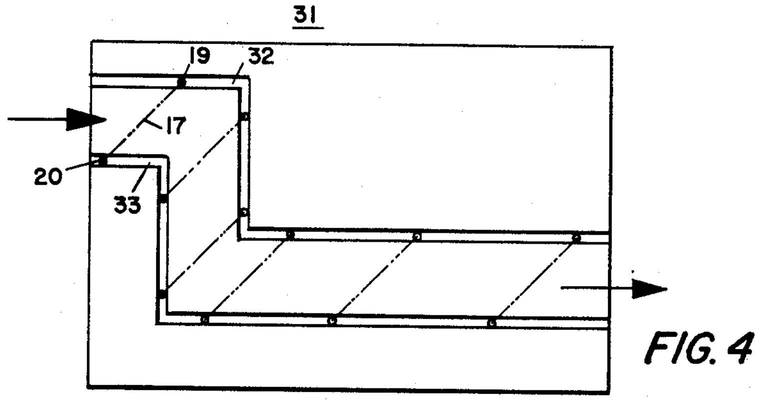
FIG. 4 is a side, schematic view of a transport apparatus illustrating yet another aspect of the invention.

*Description and explanation of the transport apparatus in FIG. 4*

Referring now to FIG. 4, there is here illustrated an open guide system generally indicated at 31 having coplanar track channels 32 and 33 modified to provide right angle turns. Here the first section of channels 32 and 33 extend in parallel spaced relation along a horizontal line as shown; in the second section, make a right angle turn to extend vertically downward in parallel spaced relation; and then in the last section, execute another right angle turn to return to horizontal parallel spaced relation. It is of interest to note that the relative precedence of tabs 19 and 20 are reversed in the second section and restored in the last section.

The motion of the air in the direction indicated produces a resultant force in the medium 17 tending to propel it parallel to the direction of the air stream. When the medium is obstructed and then guided in a direction perpendicular to its original direction, a resultant force is obtained because of the angle of the medium relative to its direction of motion.

Figure 5:
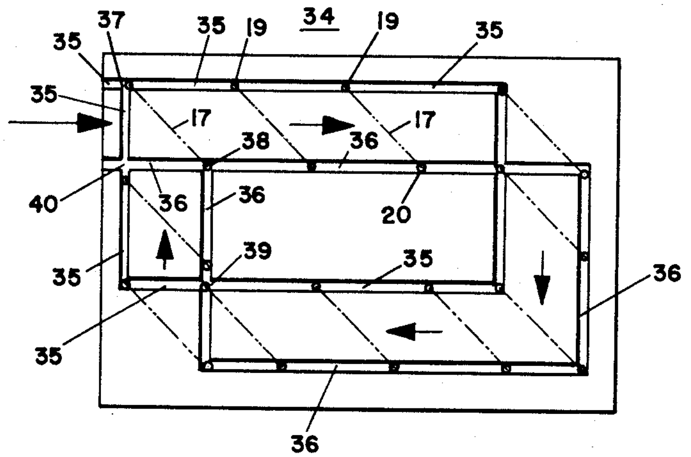
FIG. 5 is a side, schematic view of still another transport apparatus embodying the invention.

*Description and explanation of the transport apparatus in FIG. 5*

Referring now to FIG. 5, there is here illustrated a transport apparatus with a further modification. The guide system generally indicated at 34 has a transport apparatus with intersecting coplanar track channels. The apparatus of FIG. 5 particularly points up the ability to recycle a data bearing medium indefinitely.

Here, each of a pair of coplanar track channels 35 and 36 has in part the configuration of a rectangular closed loop which intersect each other at 38 and 39. A medium 17 is inserted into the channels 35 and 36 at the upper left-hand corner. It is then propelled all the way to the right, executes a right angle turn and continues its motion in a downward vertical path, executes a second right angle turn to continue its motion in the opposite horizontal direction. The medium then executes a third right angle turn to continue its motion vertically upward at which time it again executes a right angle turn to continue its motion along a horizontal direction to the right.

Because the medium is oriented at an oblique angle, one edge has enough momentum to carry it across an intersecting channel. The other edge at that time tends to restrain the medium from assuming any other direction. The other edge at that time is, of course, bounded as to its direction of motion. Later, the first edge having passed the intersection now is constrained to motion along a confined track channel. When the other edge later comes to its intersection, its momentum plus the constraint exercised on the first edge causes it to cross the intersection without deflection. This process asserts itself at the intersection 37 of channel 35 with itself, at the intersection 38 of channel 35 with 36, at the intersection 39 of channel 35 with 36, and at the intersection 40 of channel 36 with itself.

The open guide system 34 as shown in FIG. 5 presents a path for motion which is essentially rectilinear in character and, indeed, involves the intersection paths as noted above. Again with reference to the above-mentioned copending prior art application, it will be apparent that a data processing system embodying the present invention provides a flexibility in recycling ability and in enabling cross-overs of tracks which is not possible with the track rails of the prior art system. While a track rail system permits an outside right angle turn corresponding to the right angle turn of the upper right hand corner as shown, it cannot permit of an inside right angle turn of the character of that in the lower right hand corner as shown. A turn of the type illustrated in the lower right hand corner would require a rotation of the card about the track rails through the collinear relation. Again, it is clear that a track rail and notch system will not permit of a collinear disposition of track rail and card.

The motion of the driving fluid or air is channeled in such a manner as to continue to apply a propelling force to the medium.

Figure 6:
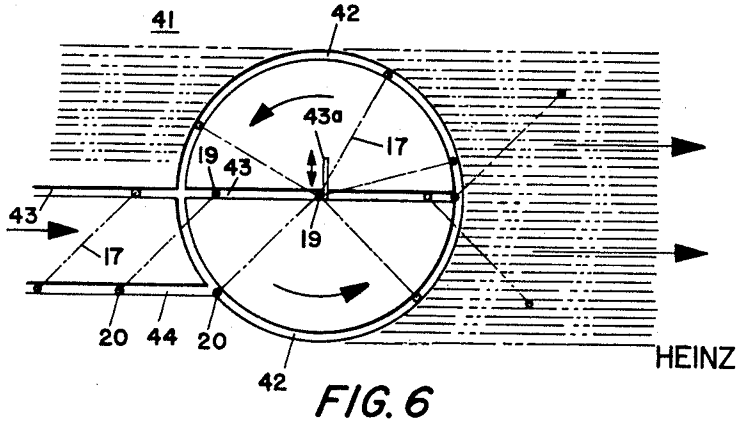
FIG. 6 is a side, schematic view of a yet another transport system embodying the invention.

*Description and explanation of the transport apparatus in FIG. 6*

Referring now to FIG. 6, there is here illustrated an open guide system generally indicated at 41. The system includes a transport apparatus having a circular channel 42. A pair of coplanar channels 43 and 44 intersect the circular channel 42. The channel 43 crosses the radial center of the circular track 42. The channel 43 may be obstructed at the radial center of the channel 42 by a slidable switching member **43*a*. The embodiment here illustrated demonstrates the inherent capability of the present system to enable a medium to rotate about an axis defined, for example, by the tab 19. In particular, the medium 17** demonstrably is capable of rotating about an axis defined by its tab extensions. This capability is particularly important to high-speed switching operations. As will be described in greater detail below, an important mechanism for switching involves the variation in angle of the medium relative to its direction of motion. It is possible simply and conveniently to rotate the medium selectively to provide a desired path of motion. This implies an inherent capability in the areas of switching, sorting, and distribution.

The medium 17 is inserted in the guide system with the extension tab 19 in the channel 43 and the extension tab 20 in the channel 44. The medium is propelled in the direction indicated by the arrows. The extension tab 19 is obstructed by the member **43*a* in the channel 43. The momentum of the medium is expended by causing the tab 20 to rotate about the tab 19 along the arcuate channel 42. With the air blast suitably directed, the card continues to rotate about the axis defined by the extension tab 19 with the tab 20 confined within the track channel 42**.

Because of the use of track channels in accordance with the invention, the medium 17, as noted above, may rotate about an axis indefinitely. The phantom lines extending from the channel 42 suggest the possible paths along which the medium may be directed with a suitable switching system. The momentum of the medium 17 may be utilized to direct it along any one of the indicated dash-lined paths. The switching element **43*a* may be removed from the channel 43 while at the same time the channel 42 is obstructed in such a manner as to direct the tab 20** along a desired path, e.g., in the manner described below. To actually reverse the direction of motion of the medium, a combination of a suitable propelling means cooperating with the momentum of the medium is appropriate.

The motion of the medium in FIG. 6 is described with respect to the particular configuration of the channel 42 shown. Additional flexibility may be obtained by causing the axis of rotation to alternate from one edge of the medium to the other. Thus, for example, channels communicating with the channel 43 may be used for switching or sorting purposes by restricting the motion of the tab 20 in the channel 42. The transfer of the axis of rotation from the tab 19 to the tab 20 enables motion of the medium along paths not shown in FIG. 6. This concept is serially additive, enhancing the inherent flexibility of the system. It will be apparent to a person with ordinary skill in the art that the invention is applicable to many geometrical configurations whereby extremely intricate switching and sorting paths may be realized.

*Description and explanation of the data processing system in FIGS. 7, 8, 9 and 10*

Figure 7:
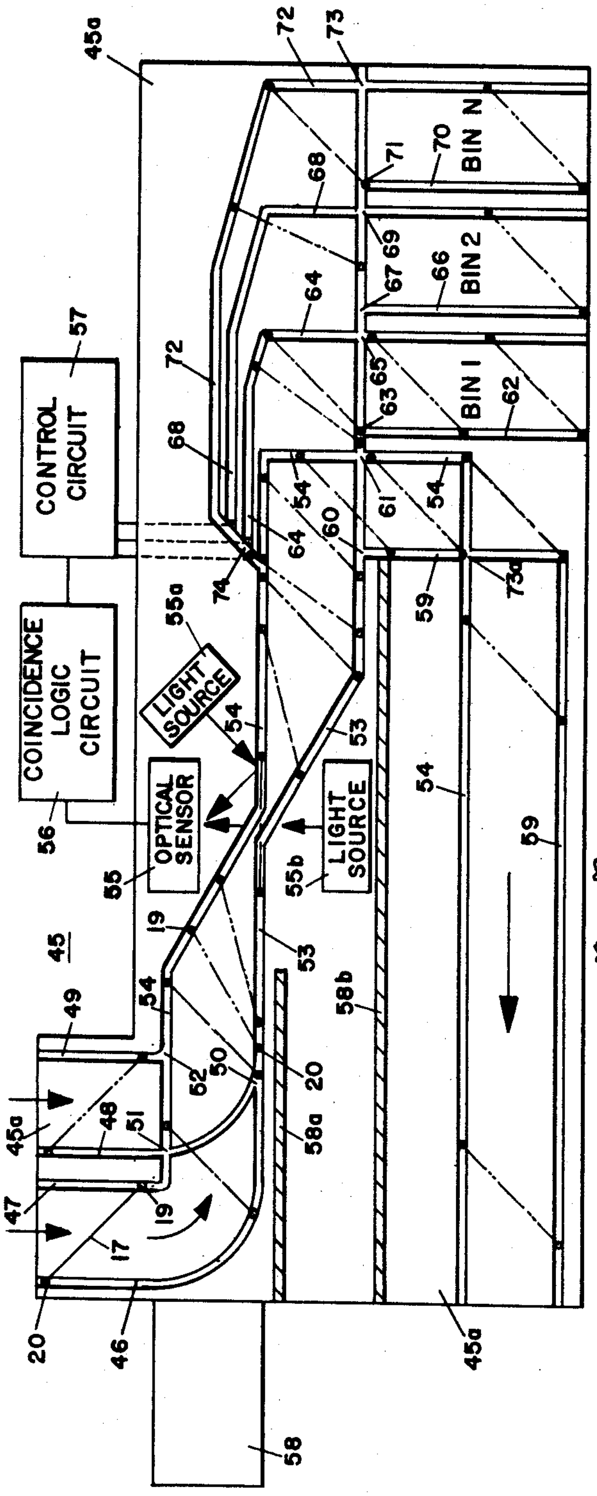
FIG. 7 is a side, schematic view of a data processing system embodying the invention.

Referring now to FIG. 7, there is here illustrated a data processing system embodying the invention. The system as shown in FIG. 7 is particularly directed to optical sensing of an optical code displayed graphically on the face of a data bearing medium. The system includes an open guide system having a transport apparatus with a plurality of input sections wherein media may be loaded. The transport sections are coupled together to intermix the cards in a desired order, and thence to a section where the medium is propelled along its own plane in proximity with an optical sensing device for reading, e.g., an identification code. The optical sensing section is then coupled to a switching section. Switching is accomplished at a single location to direct a medium along a preselected sorting channel path in accordance with a desired sorting program as determined by the identification codes recorded on the medium. The sorting channels are coupled to storage bins or, alternatively, to a recycling transport mechanism.

Thus, a data processing system with an open guide system is generally indicated at 45. The system is generally bounded by a pair of parallel, spaced side panels **45*a*** parallel to the plane of the drawing and supporting, spacing panels connecting the side panels together at their edges. The connection panels are so disposed as to avoid interference with the motion of the media.

An input section bounded by a pair of coplanar track channels 46 and 47 formed in the side panel receives a data bearing medium 17. The extension tabs 19 and 20 engage the channels 46 and 47 to provide slidable motion along the channels 46 and 47. A second section for loading the medium is bounded by a pair of channels 48 and 49. The channel 46 merges with the channel 48 at an intersection point 50. The channel 47 intersects the channel 48 at the intersection 51 and merges with the channel 49 at an intersection point 52.

Extending from the intersections 50 and 52 are track channels 53 and 54, respectively. Initially, the channels 53 and 54 are disposed in parallel, spaced relation. The channel 54 converges toward the channel 53 until the two channels become collinear. An optical sensing device 55 is disposed in the region of collinearity of the channels 53 and 54 in proximity with the medium when the medium is collinear with the channels 53 and 54. Where the medium carries an identification code on its face, this code is sensed by the sensing device 55 by causing light to be projected through the medium in the case of a transparency, or reflected light for graphic markings on an opaque card. For reflected light sensing, a light source at 55*a* may be used; for transparencies, the light source at 55*b*. In addition, reflex light from a source in the sensor 55 is useful. The output of the sensing device 55 is coupled to a coincidence logic circuit 56. The circuit 56 receives the data and compares it with an instruction based on a desired program for the medium. The instruction may be a program of ordering the media for sorting into storage bins or for some other use. The circuit 56 is coupled to a control circuit 57 which includes a switch actuator, not shown. The circuit 57 is coupled to a switching mechanism for switching and sorting the media.

An air blower 58 provides a source of moving air, for example, at 100 cubic feet per minute, for propelling the medium, in the form of a card 2 x 3 inches, along the track channels. A guide vane 58*a* is attached to the panels, perpendicularly to the side panels, to direct the flow of air along a path pasisng the optical sensing unit. Another vane 58*b* is disposed in such a manner as to direct the flow of air along the recycling path defined by the channels 54 and 59.

The channel 43 successively intersects channels 59 at the intersection 60, 54 at the intersection 61, 62 at the intersection 63, 64 at the intersection 65, 66 at the intersection 67, 68 at the intersection 69, 70 at the intersection 71, and 72 at the intersection 73.

The track channel 54 intersects the switching track channel 74 which communicates with each of the sorting channels 64, 68 and 72. The channels 62 and 64 define a storage bin No. 1, the channels 66 and 68 the storage bin No. 2, and the channels 70 and 72 define storage bin No. N. The appellation, Nth storage bin, implies that a plurality of storage bins may be used and the number shown is arbitrary.

The track channel 54 intersects the channel 59 at intersection 73*a*. The channels 54 and 59 extend on to the left, as shown, in parallel, spaced relation to provide a transport apparatus for returning the cards for recycling purposes. The output of the recycling transport is not shown here. Recycling, however, can be, as described above, channeled into the input path to cause the medium to circulate within the guide system. The recycling path may also be coupled to an ordering device for ordering the cards at a desired sequence.

Figure 8A:
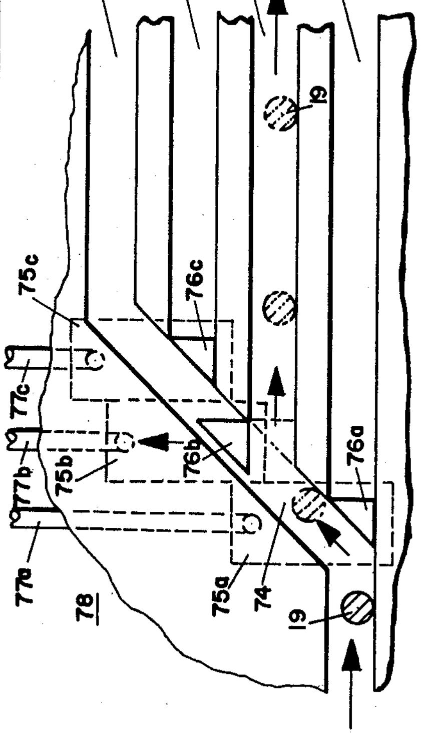
FIGS. 8 and 8A are detail, side schematic views of a portion of the system in FIG. 7.
Figure 8:
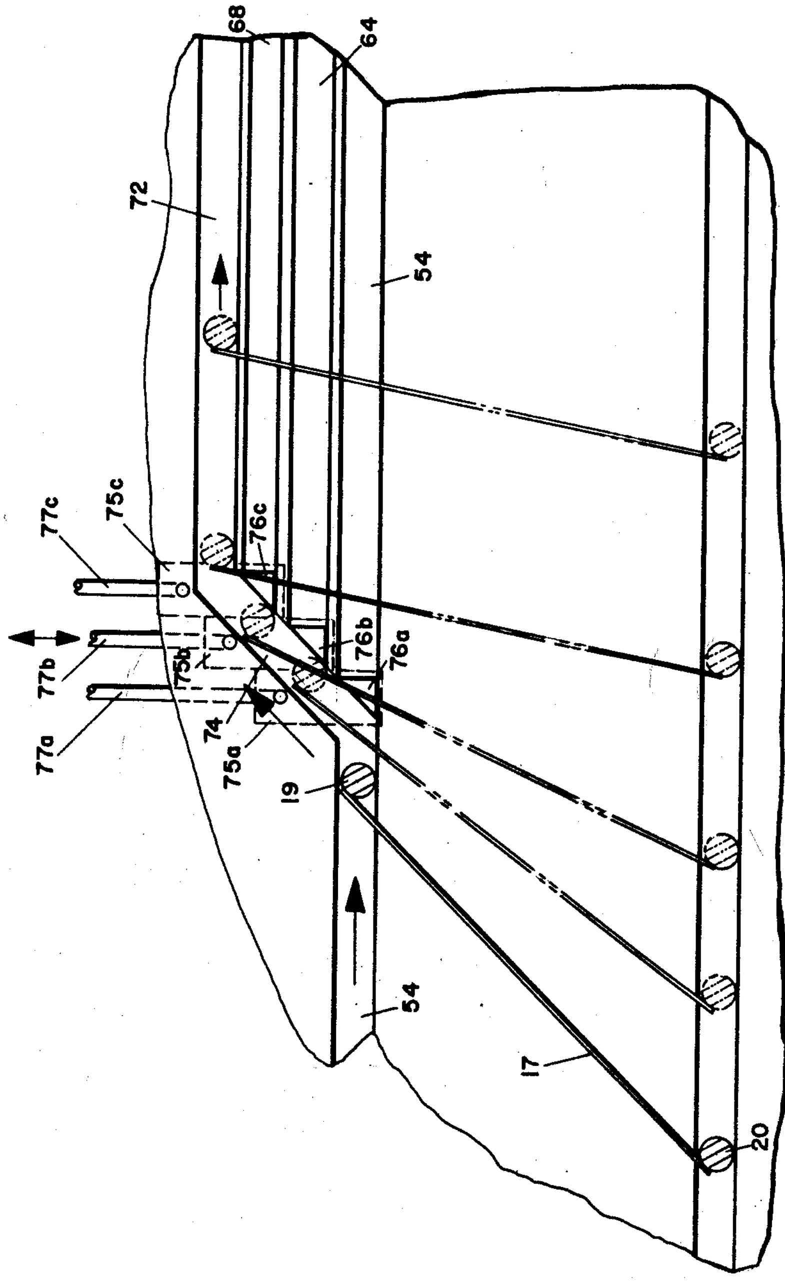
Figures 9, 10:
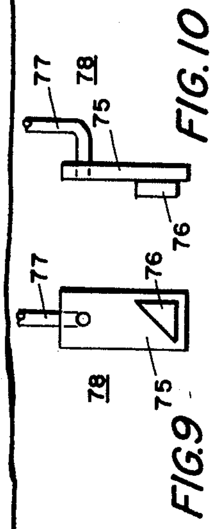
FIG. 9 is a front view of a switching member used in the apparatus of FIG. 8.
FIG. 10 is a side view of the member in FIG. 9.

FIGURES 8, 9, and 10, the switching apparatus is more specifically described. Certain aspects of this switching system are disclosed and claimed in a separate copending application of Cooper and Zeutschel, filed August 17, 1961, Serial No. 132,114. As shown partially in phantom in FIG. 8, and in more detail in FIGS. 9 and 10, movable switching members generally indicated at 78*a*, *b*, and *c* each include a planar rectangular supporting member 75*a*, *b*, and *c* respectively which carries a triangular switching step element 76*a*, *b*, and *c* and a linkage arm 77*a*, *b*, and *c* respectively. The triangular switching elements 76*a*, *b* and *c* each present an inclined plane or wedge which obstructs or clears one of the channels 54, 64, or 68. For an N channel distribution system, the Nth channel, here channel 72, is normally clear and is obstructed when at least one of the switching members 78 cooperating with the channel 74 is in a position to clear one of the channels 54, 64, or 68. The linkage arms 77 are coupled to an appropriate system of solenoid actuators which control the positions of the switching members 78 in accordance with a control signal from the circuit 57. The control signal from the circuit 57 is produced in response to an intermediate control signal derived from the coincidence logic circuit 56.

The switching operation takes place by virtue of the ramp-like effect presented to the extension tab 19 of a medium 17. The tab or pin may be occluded from pursuing its normal path by the elements 76 inserted as an obstruction. The tab 19 then rides up the hyptoenuse of the triangle along the ramp to the next channel. If that channel is clear and the switching channel 74 is obstructed, the pin rides, for example, along the channel 64, as shown in FIG. 8A, which directs the medium to bin No. 1. Effectively, the pin 19 is decelerated relative to the pin 20 and, indeed, rotates about the axis defined by the pin 20 for switching and sorting purposes.

Broadly there are two approaches to the switching-sorting problem. Media may be directed down a single path and the switching may take place at the position of each bin. The alternative, as used in the present system, is to switch a desired medium into a predetermined selected path which directs it to a desired storage bin. In a system wherein switch must take place at the position or location of a particular storage bin, the rate of release and feeding of each medium is limited by the travel time of a given medium required to traverse all of the storage bins. This can only be overcome in such a system by including a sensing element at the location of each storage bin or sorting channel, greatly increasing the complexity of equipment required.

The system of the copending application is limited to switching at the location of a storage bin or sorting channel. This limitation arises because of the requirement for crossing intersecting tracks. Track rails are clearly incompatible with this requirement.

Additionally, track rails limit the useful angle of inclination of the medium, particularly when closely spaced in parallel relation.

The present invention incorporates the second approach in order to maintain very high switching rates. In the instant system only a relatively short time is required for a medium to pass all switching points in a given switching section.

The switching capability of a track channel system embodying the invention is indicated in the description of FIG. 6 above. Note that the switching system illustrated is reciprocal. It is thus possible, for example, as shown in FIG. 7 for media directed toward channel 74 from channel 68 to be switched into channel 34. The media may also be directed to one of the input sections with suitable control of the air flow. Furthermore, another set of sorting channels extending from the channel 74 opposite the direction of the channels 54, 64, 68, and 72 may be used to increase the system flexibility.

OPERATION

A medium may be introduced to engage the first input section defined by the channels 46 and 49 or the second input section defined by the channels 48 and 49. The number of input sections is again arbitrary depending upon a particular requirement. Although the input sections are shown spaced closely together, for particular applications it may be desirable to space them a substantial distance apart. When a plurality of media are introduced via the input sections, or via a recycling channel not shown, the rate of insertion into the system is controlled to avoid undesirable concentrations or "pile ups."

A medium introduced in engagement with the first input section, channels 46 and 47, drops under the influence of gravity until the tab 20 reaches a point along the channel 46 where air from the blower 58 initiates propelling action. The medium travels along the channels 46 and 47 crossing the intersections 50, 51 and 52. The medium then continues along the channels 53 and 54 at an oblique angle relative to its direction of motion of, for example, 45°. At the point where the channel 54 converges toward the channel 53, the pin 20 is accelerated relative to the pin 19. At the point where the channel 54 becomes collinear with the channel 53 the momentum of the medium 17 causes it to move along its own plane. Although not shown, the medium may be trapped at this point and held in position for viewing purposes or for extraction from the system. In the system as shown, however, the medium carries an optical identification code, such as black and white stripes. Light from the source 55(*a*) or 55(*b*) is applied to or through the medium to enable the sensor 55 to sense the optical identification code indicia. The sensor 55 converts the optical data indicia, preferably into a series of electrical signal impulses which are coupled to the circuit 56. The circuit 56 may be programmed, for example, to extract a desired medium for viewing purposes. The circuit compares the data from the sensor 55 with a programmed reference signal. If the received data coincides with the instruction or reference signal, a control signal is applied to the control circuit 57. The circuit 57 includes, for example, solenoid actuators to operate a switching mechanism.

The medium moves along the channels 53 and 54 back into an oblique angle when the channels become parallel. When the medium reaches the switching apparatus, the pin 20 is directed along the switching channel 74. With the switches as shown, the pin 20 continues to travel along the channel 74 and thence along the channel 72 to the bin N. The pin 19 crosses intersection 61, 65, and 69 and executes a right angle turn at intersection 71 to travel along bin N bounded by the channels 70 and 72.

The motion of the pin 19 along the track channel 74 is particularly illustrated in FIG. 8. As shown in that diagram, the switching elements 76(*a*), 76(*b*), and 76(*c*) obstruct the channels 56, 64, 68, respectively, and provide an inclined plane surface coextensive with one side of the channel 74 to direct the pin to the sorting channel 72. The motion of pin 19 relative to pin 20 and the variation in angle of orientation of the medium 17, is shown in FIG. 8.

In FIG. 8A the switching element 76(*b*) is in position to obstruct channel 74 and clear channel 64. This causes the pin to travel along the sorting channel 64 which directs the medium to bin No. 1. For recycling channel may be coupled to an output viewer or reproduction device such as a well-known reader-printer.

The circuit 56 may be programmed in such a manner as to select and extract a desired medium or to direct it for sorting or switching purposes into storage bins. The recycling path is normally available for media which do not fit the instruction pattern.

Figure 11:
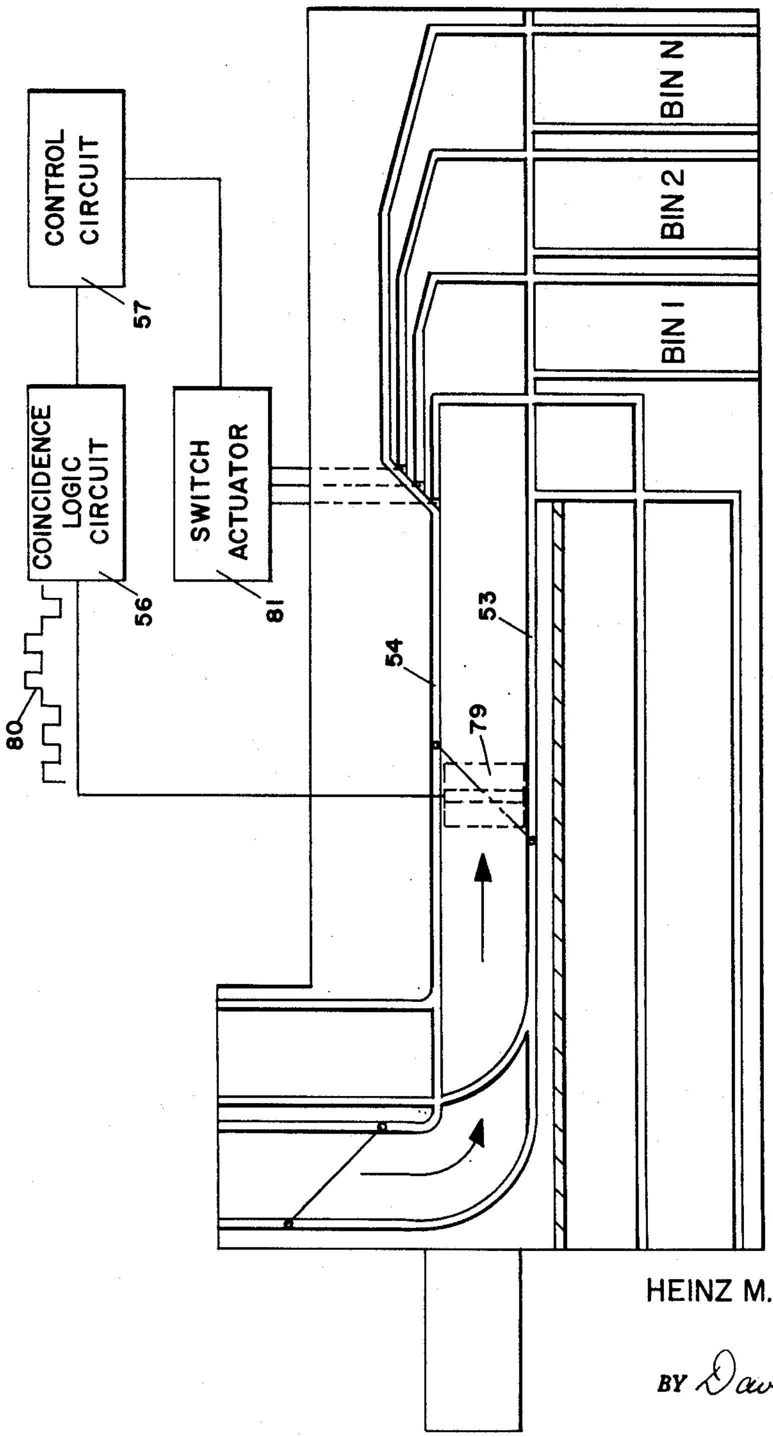
FIG. 11 is a data processing apparatus generally similar to that in FIG. 10, but modified for magnetic sensing of an identification code.

*Description and explanation of the data processing system in FIG. 11*

In FIG. 11, the data processing system is modified relative to that in FIG. 7 to eliminate the section of track channel necessary for the medium to travel in its own plane. In the place of that section the pair of coplanar channels 54 and 53, disposed in parallel spaced relation, are extended as shown. In place of the optical sensing device is a magnetic sensing device 79. Here, the medium is treated with a striping of ferromagnetic material such as iron oxide as used in well-known magnetic recording tape. A binary magnetic code is recorded on the striping to provide indicia for identification of the individual medium. In a copending application of Oliver, filed August 17, 1961, Serial No. 132,141, entitled Data Processing Circuit, a description of the related logic circuits is included. The output of the sensing device 79 is a train of pulses 80 which are coupled to the coincidence logic circuit 56 and thence to the control circuit 57. As shown in FIG. 11, the circuit 57 is coupled to a switch actuator 81 which is coupled to the switching track system corresponding to that described with regard to FIG. 7.

Figure 12:
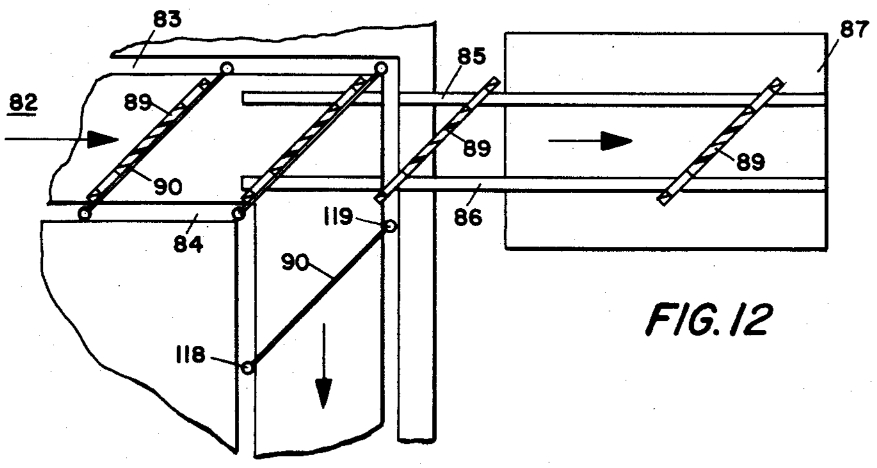
FIG. 12 is a transport apparatus embodying the invention and illustrating another aspect of the invention.

*Description and explanation of the transport apparatus in FIG. 12*

Figures 15, 16:
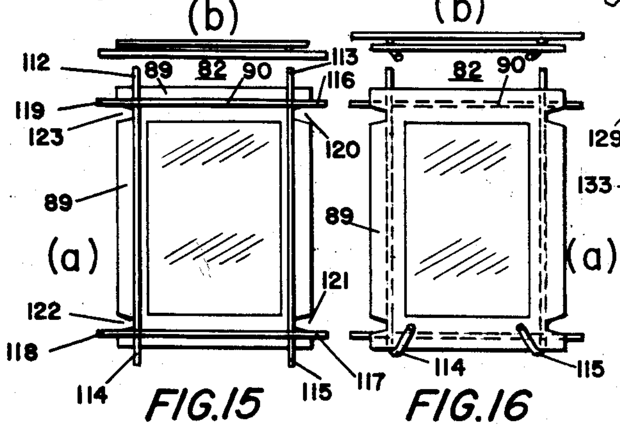

In FIG. 12 a data processing system is shown with an open guide system for use with the medium 82 having notches to receive track rails. The apparatus as shown is intended to separate a notched film card or chip 89 from a carrier 90. The film card may then be transported to a magazine and the carrier transported in another direction to some other storage device or for some other use. The medium 82 is shown in FIG. 16.

With air flowing in the direction indicated, the medium 82 is directed along a pair of track channels 83 and 84 which execute a right angle turn. A pair of coplanar track rails 85 and 86 are disposed to engage notches in the film card 89. The velocity of the card is sufficient to detach it from the carrier and send it along the rails 85 and 86 to a magazine 87 for storage. The carrier executes a right angle turn and is directed to another place for storage or further use. Thus, the notched film card travels along the rails 85 and 86 to a magazine 87 and the carrier 90 travels along the channels 83 and 84 to another location. The momentum of the film card or chip 89 is sufficient to carry it past the gap in the rails 85 and 86 provided by the intersection of the channel 83.

One mechanism for providing a detachable film chip is to "piggyback" the chip or card on a carrier frame. This may be accomplished with the embodiment of the medium in FIG. 16 below. With the ends 114 and 115 of such a medium turned up away from the direction of motion, the force of the propelling air keeps the film card attached to the carrier. When the carrier is removed, as in FIG. 12, the film chip or card proceeds along in engagement with the rails. By reversing this procedure it is possible to attach a film card to the carrier.

*Description and explanation of the data bearing media in FIGS. 13, 14, 15, 16, 17*

Figure 13:
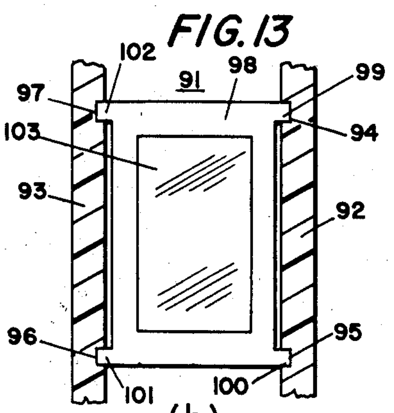
FIGS. 13, 14, 15, 16 and 17 are plan views of various data bearing media embodying the invention.

In FIG. 13 a data bearing medium is shown supported in four track channels formed in a pair of parallel panels oppositely disposed and spaced to accomodate the medium preferably at an oblique angle relative to its direction of motion.

Thus, a data bearing medium generally indicated at 91 is supported by a pair of panels 92 and 93 in which track channels 94, 95, 96, and 97 are formed. The medium 91 comprises a carrier 98 formed from a lattice of supporting members to provide four extension tabs 99, 100, 101, and 102 engaging the track channels 94, 95, 96, and 97 respectively. The carrier 98 carries a data bearing body of film 103, which typically carries photographic information. The data bearing film may be an opaque medium carrying information visually presented by reflected light or a transparency providing visual information with light passing through the film. Here the carrier may be readily formed by stamping a sheet of material. The extension tabs thus produced, however, are rectangular in cross-section. Because of the requirement for rotating the card about an axis defined by a pair of opposed extension tabs, it is frequently preferable to use extension tabs having a circular cross-section.

Figure 14:
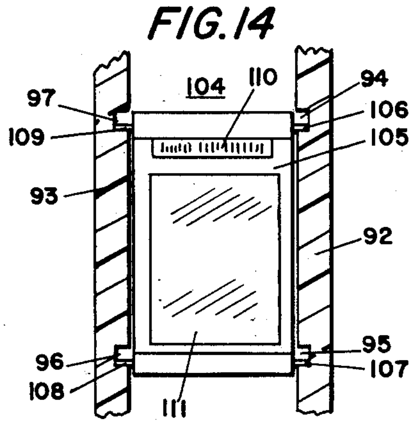

In FIG. 14, a medium generally indicated at 104 is shown supported by the panels 92 and 93. While the medium 104 is somewhat similar to the medium 91 in FIG. 13, a carrier 105 is wrapped around a pair of cylindrical rods to provide four extension tabs 106–109, inclusive, corresponding with channels 94–97, respectively. Included on the carrier is an optical code 110 and data bearing film 111. This medium may be used with a striping of magnetically retentive material in addition to the optical coding. The cylindrical rods have, of course, a circular cross-section greatly enhancing the ability of the medium to rotate with respect to an axis defined by a pair of oppositely disposed pins.

The medium 82 as shown in FIG. 15 includes the carrier formed from a lattice of supporting members to provide four extension tabs or pins 112–115, inclusive, extending from the upper and lower edges, as shown, and four tabs 116–119, inclusive, corresponding with the channels 94–97, respectively. The film 89 is so affixed to the carrier 90 as to permit the film to be disengaged from the carrier at a suitable force level for use in the transport apparatus of FIG. 12. The film card may be affixed to the carrier by using alignment pins extending from the intersection points of the carrier frame elements. The alignment pins register with holes in the film card or chip. Additionally, if the film card or chip is profiled to provide reinforcing grooves, such as the grooves 120 and 131 in FIG. 17, the vertical rods 112 and 113 of the carrier may register with these grooves.

The film is adapted by virtue of the notches 120–123, inclusive, to engage track rails in a manner similar to that disclosed in the prior art system of the above-mentioned copending application. This medium is also adapted for transport in a track channel system involving a four sided open guide system having channels in all four sides. It will be apparent that two pairs of oppositely disposed coplanar channels are suitable for guiding the medium with respect to one orientation and an orthogonal set of two pairs of coplanar channels for the orthogonal orientation.

In FIG. 16, a modification of the card in 15 is shown wherein the tabs 114 and 115 are curled to support the film 89. The amount of curl is chosen to correspond with the orientation angle of the card during its linear motion. With the tabs 114 and 115 curled, as shown, the film 89 is supported in place until such time as the film 89 is separated from the carrier 90 by an apparatus such as that in FIG. 12.

Figure 17:
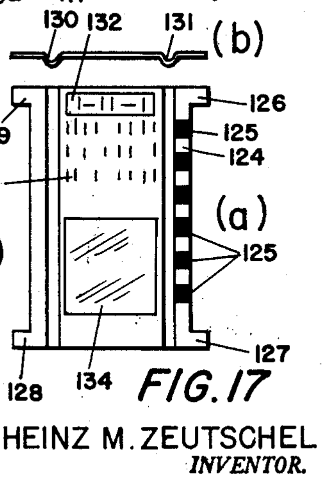

The card in FIG. 17 is useful for both optical and magnetic identification code indicia as well as carrying data of a graphic character on its face. This film card is formed entirely from a photographic film card or chip having two elongated corrugations formed in the film to provide reinforcing. The corrugations are useful for both separating one chip from another and mechanical stability. Additionally, these corrugations are helpful for locating and registering a film chip or card with respect to another medium as, for example, a carrier. Furthermore, the corrugations may be utilized as transport rails and guides when the film chip or card is transported in its own plane. This is particularly helpful when used with a viewing device.

Here the chip is found shown with a striping 124 having magnetic coding recorded at the points 125. In FIG. 17 a film chip, as shown, has integrally formed extension tabs 126–129, inclusive, corresponding with the channels 94–97, respectively. Elongated corrugations 130 and 131 are formed in the film chip as noted above. The shape of the corrugation is particularly shown in 17(*b*). The chip carries an optical identification code 132, visual data such as reading material 133 and a pictorial image 134. The optical identification code consists of a series of vertical or horizontal lines which correspond with a binary designation. It will be noted that the magnetic coding is position oriented. In those areas where magnetic code indicia exist, graphic presentation may be used at the same time to provide both visual and magnetic and identification code indicia.

The data bearing medium as described above provides a flexible vehicle of carrying information in various forms and for various applications. What is termed the carrier may be coded or bear other data for "face" or "edge" presentation. What is termed the body, chip or card, may include the carrier and bear data in its various forms. The well-known IBM system uses paper cards. The present system incorporates the use of such cards merely by adding a carrier frame. The card itself may be used to carry film chips or film cards as well as other data. Thus, all of the techniques developed to date for punched cards and conductive printing may be included in the present system without the limitations of the earlier systems.

*Description and explanation of the apparatus in FIGS. 18–24*

Referring now to FIGS. 18–24, there is here presented a data processing apparatus generally indicated at 135. The apparatus includes a transport device and storage bins coupled together with a switching track channels network. Switching means control the motion of a data bearing medium to determine its path in the direction of a selected bin or distribution path.

Figures 18, 19, 20, 21, 22, 23, 24:
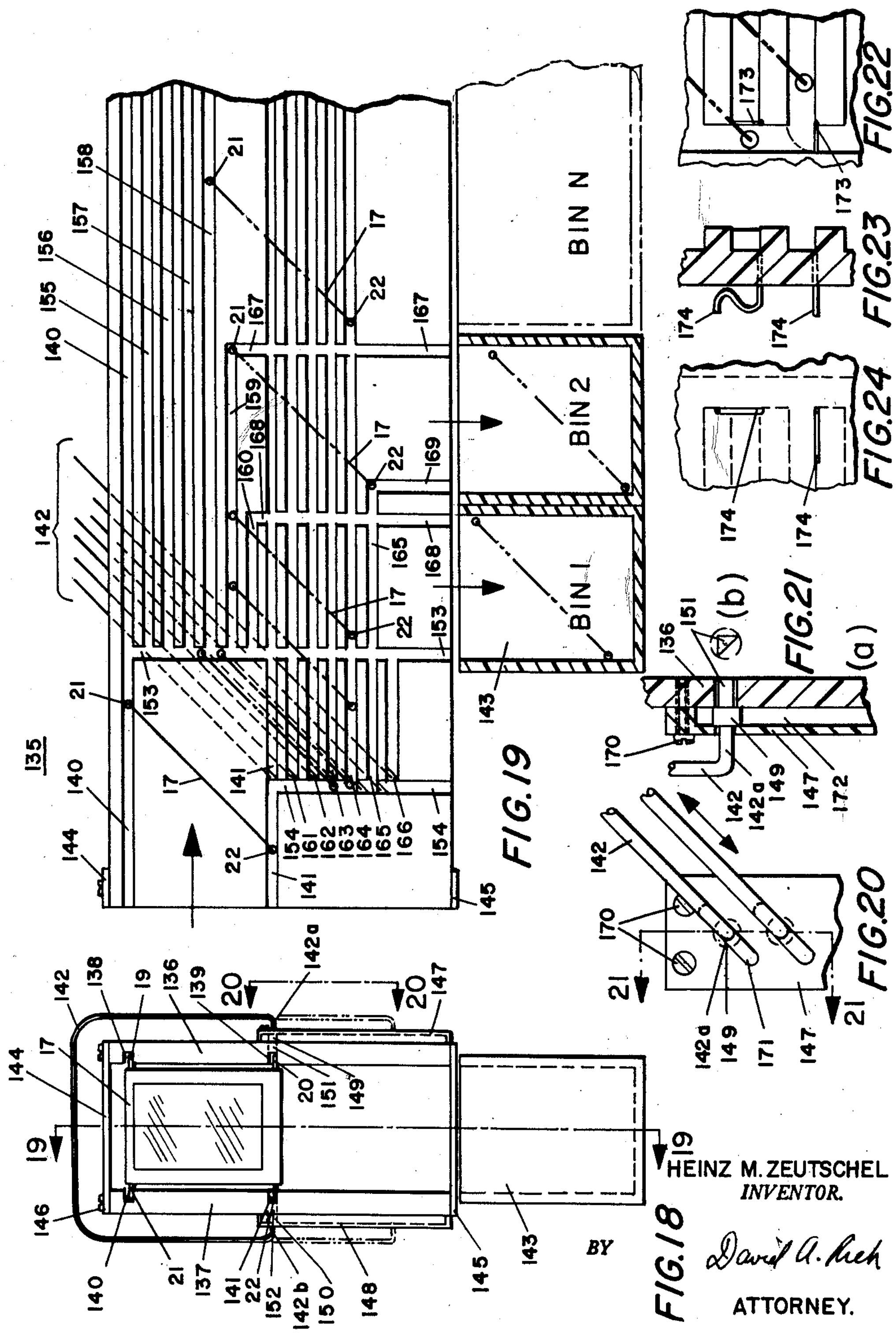
FIG. 18 is an end view of a further modification of the data processing apparatus in FIG. 7.
FIG. 19 is a side sectional view of the apparatus in FIG. 18 taken along the lines 19—19.
FIG. 20 is a fragmentary front detail view of a switching member in the apparatus of FIG. 18.
FIG. 21 is an enlarged end sectional view of a portion of FIG. 20.
FIG. 22 is a detail, side sectional, fragmentary view of a modification of the switching device in the apparatus of FIG. 18.
FIG. 23 is a sectional view of the device in FIG. 22.
FIG. 24 is a front view of the device in FIG. 22.

The end view FIG. 18 principally illustrates a pair of supporting parallel side panels 136 and 137 having two pairs of parallel, spaced, track channels 138, 139, 140, and 141 respectively formed therein. The channels support a data bearing medium 17 at an oblique angle. A plurality of rectangular, loop shaped switching actuators 142 having arms 142*a* and 142*b* actuate the switching of media as will be described below. A storage bin 143 is shown extending below the level of the switching system. The panels 136 and 137 are mounted in place by supporting bars 144 and 145 by screws 146.

A pair of grooved actuator panels 147 and 148 are attached to the panels 136 and 137 respectively. A pair of retainer bearing members 149 and 150 are slidably mounted between the panels as shown. The retainers are affixed to the arm 142 to restrict travel along slots formed in the panels 147 and 148. The actuator arms 142*a* and 142*b* have a pair of triangular switching elements 151 and 152 affixed to the ends, see FIGS. 20 and 21.

In FIG. 19 the distribution paths are particularly illustrated. The channels 140 and 141 intersect right-angle switching track channels 153 and 154 respectively. The channel 153 feeds sorting channels 155–160, inclusive, and the channel 154 feeds sorting channels 161–166, inclusive. The channel 153 intersects channels 161–166, as shown. Channel 159 intersects a right angle sorting channel 167; channel 160 intersects sorting channel 168.

The channels 167 and 168 intersect channels 141 and 161–164. The channel 168 also intersects channel 165 which, in turn, intersects a right angle sorting channel 169. The channels 153 and 168 direct data bearing medium to a storage bin 143 indicated as bin 1. The channels 167 and 169 direct a medium to bin 2.

While the system as shown is limited to the two storage bins, bin N indicates that the system is expandable to an arbitrary number of storage bins with an arbitrary number of sorting track channels. By, for example, so connecting channels 153 and 168 as to provide connections to another switching track channel, similar to channels 153 and 154, the system may be serially expanded. Thus, a switching network may be developed sufficiently to service any finite number of storage bins or transport paths.

The switching elements 151 and 152 are slidably mounted in the channels in such a manner as to control the direction of motion of the lower pin or tab 20 and 22 respectively. The medium 17 is also directed by selected positioning of right angle turns.

In FIGS. 20 and 21 the switch actuator mechanism is illustrated in enlarged detail views. In FIG. 20, of a right side view the panel 147 is shown. The panel is mounted by a pair of screws 170. The actuator 142 moves in the direction indicated by the arrow. The arm 142*a* is inserted through a groove 171 into connection with the retainer bearing 149. The motion of the arm 142*a* is restricted by the ends of the groove 171.

In the enlarged sectional view of FIG. 21, taken along the line 21—21 in FIG. 20, a portion of the panel assembly is revealed. The retainer 149 is disposed in a space or chamber 172 disposed between the outside of supporting panel 136 and the inside of panel 147. The panel 147 has a depression formed in it to provide the space 172. Affixed to the retainer 149 and arm 142*a* is the switching element 151 which is triangular in shape as shown in side view of FIG. 21(*b*).

In operation a data bearing medium 17 is inserted with the pins or tabs 19–22 engaging the channels 138–141, respectively. The medium is inclined at an oblique angle as shown in FIG. 19 and propelled by a flow of air. When the pin 22 reaches the intersection between the channels 141 and 154, the position of the switching element determines the path of the medium. When the actuator 142 is moved to its outer extreme position, as shown, the element 152 slides along its hypotenuse to occlude the channel 141 and clear the channel 154. The element is preferably in the form of a right triangle to conform its sides with the walls of the channels.

The actuators 142 may be relay or cam actuated in accordance with a program related to a desired identification code for selective switching.

With the occlusion of channel 141, the pin 22 rides down the channel 154, pulling the pin 21 down the channel 153. The medium continues its travel until the channel 154 is occluded, here at the intersection with channel 164.

The medium 17 then rides along channels 158 and 164 to a remote destination or to a recycle path.

If the channel 164 is occluded, the pin 22 rides down to channel 165 and the medium executes a right angle turn and travels along channels 159 and 165. At the intersections with channels 167 and 169 another right angle turn is executed. The medium then travels down the channels 167 and 169 to bin 2.

The medium may be directed to bin 1 by obstructing channels 161–165 intersecting channel 154. By clearing channel 166, and blocking channel 154, the medium is directed along channels 160 and 166 to channels 153 and 168 and thence to bin 1. Note that a similar course may be provided by channels 157 and 164 to a bin 3, etc.

Thus, because of the use of track channels, switching may be accomplished by the simple mechanism of obstructing or clearing selected channels communicating with a single switching channel, such as 154. The use of the track channels enables this medium to cross channels without deflection. In this manner complicated distribution systems are possible with a basically simple switching mechanism.

In FIGS. 22, 23, 24 a lever switch is shown. Here a switch element 173 is rotated by a lever arm 174 in such a manner as to obstruct one of two intersecting channels and clear the other. In a similar manner, the switching system may be run in reverse.

The methods, systems, apparatus and data bearing media for data processing embodying the invention greatly enhance the capability and flexibility of data processing. This is particularly true with regard to the handling of graphic data bearing bodies.

In accordance with the discussion above, it will be apparent that the present system provides an important step forward in the direction of automating the handling of data bearing materials and particularly the handling of graphic data bearing media.

While there have been described what are at present considered to be the preferred embodiments of the invention, it will be apparent to those skilled in the art that various changes and modification may be made therein without departing from the invention, and it is, therefore, aimed in the appended claims to cover all such changes and modifications as fall fairly within the true scope and spirit of the invention.

What is claimed is:

1. A data processing system for processing selected data bearing media from a group thereof, said data processing system, comprising:

a plurality of uniquely coded planar data bearing media each having a plurality of engagement means extending beyond a pair of opposite edges thereof, said code being representative of the data stored in the plane of said media;

transport means having a plurality of parallel, spaced track channels to receive said engagement means therein for supporting said media while said media is transported therealong, said track channels having at least two of said track channels intersecting in the same plane to enable said media to cross track channels when in motion to selectively process selected media; and fluid drive means coupled to said transport means for propelling said media along said track channels, whereby data from selected data bearing media is retrieved.

2. The data processing system of claim 1, wherein said media is supported in said track channels at an oblique angle relative to the direction of motion of said media along said channels while said media is transported therealong, said track channels being disposed in opposed parallel planes and having varying spacing for changing said oblique angle.

3. A data processing system for processing selected data bearing media from a group thereof, said data processing system, comprising:

a plurality of uniquely coded planar data bearing media each having a plurality of engagement means extending beyond a pair of opposite edges thereof, said code being representative of the date stored in the plane of said media;

transport means having a plurality of parallel, spaced track channels to receive said engagement means therein for supporting said media while said media is transported along said channels, said track channels being coplanar, at least in part, so disposed adjacent said edges of said media as to enable their motion in their own plane to selectively process selected media; and fluid drive means coupled to said transport means for propelling said media along said track channels, whereby data from selected data bearing media is retrieved.

4. A data processing system for processing selected data bearing media from a group thereof, said data processing system, comprising:

a plurality of uniquely coded planar data bearing media each having two pairs of tab extension means extending beyond a pair of opposite edges thereof, said code being representative of the data stored in the plane of said media;

transport means having two pairs of parallel, spaced track channels to receive said tab extension means therein, said track channels being arranged in two pairs disposed in opposing parallel planes adjacent said opposite edges with the spacing between the members of each of said track channel pair being less than the spacing between the members of each of said tab extension means for guiding said media along said track channel with said media disposed at an oblique angle therein and said track channels having varying spacing for changing said oblique angle and at least two of said track channels intersecting in the same plane to enable said media to cross track channels when in motion to selectively process seelcted media; and fluid drive means coupled to said transport means for propelling said media along said track channels, whereby data from selected data bearing media is retrieved.

5. The data processing system of claim 4 wherein said edge guide extension tabs are circular rods.

6. A data processing system for processing selected data bearing media from a group thereof, said data processing system, comprising:

a plurality of uniquely coded planar data bearing media each having a plurality of engagement means extending beyond a pair of opposite edges thereof, said code being representative of the data stored in the plane of said media;

transport means having a plurality of parallel, spaced track channels to receive said engagement means therein for supporting said media while said media is transported therealong, said track channels having at least two of said track channels intersecting in the same plane to enable said media to cross track channels when in motion to selectively process selected media; and fluid drive means coupled to said transport means for propelling said media along said track channels, whereby data from selected data bearing media is retrieved; and sensing means coupled to said fluid drive means and disposed adjacent said channels for scanning said code and producing an output signal representative of said code, whereby data from selected data bearing media is retrieved.

7. A data processing system for processing selected data bearing media from a group thereof, said data processing system, comprising:

a plurality of uniquely coded planar data bearing media each having a plurality of engagement means extending beyond a pair of opposite edges thereof, said code being representative of the data stored in the plane of said media;

transport means having a plurality of parallel, spaced track channels to receive said engagement means therein for supporting said media while said media is transported therealong, said track channels having at least two of said track channels intersecting in the same plane to enable said media to cross track channels when in motion to selectively process selected media;

fluid drive means coupled to said transport means for propelling said media along said track channels; and means coupled to said drive means for altering the direction of motion of one edge of each of said media relative to its opposite edge.

8. A data processing system for processing selected data bearing media from a group thereof, said data processing system, comprising:

a plurality of uniquely coded planar data bearing media each having a plurality of engagement means extending beyond a pair of opposite edges thereof, said code being representative of the data stored in the plane of said media;

transport means having a plurality of parallel, spaced track channels to receive said engagement means therein for supporting said media while said media is transported therealong, said track channels having at least two of said track channels intersecting in the same plane to enable said media to cross track channels when in motion to selectively process selected media;

switching means coupled to said transport means and having a switching track channel intersecting a transport channel;

a movable switching element so disposed adjacent the intersection as to simultaneously obstruct one of said intersecting channels and clear the other channel;

switch actuator means coupled to said switching element for controlling the position of said switching element selectively to switch a data bearing medium along a desired one of said track channels; and fluid drive means coupled to said transport means for propelling said media along said track channels, whereby data from selected data bearing media is retrieved.

9. A data processing system for processing selected data bearing media from a group thereof, said data processing system, comprising:

a plurality of uniquely coded planar data bearing media each having a plurality of engagement means extending beyond a pair of opposite edges thereof, said code being representative of the data stored in the plane of said media;

transport means having a plurality of parallel, spaced track channels to receive said engagement means therein for supporting said media while said media is transported therealong, said track channels having at least two of said track channels intersecting in the same plane to enable said media to cross track channels when in motion to selectively process selected media;

switching means coupled to said transport means and having a switching track channel intersecting a transport channel at a right angle;

a movable switching element disposed adjacent the intersection as to simultaneously obstruct one of said intersecting channels and clear the other channel;

switch actuator means coupled to said switching element for controlling the position of said switching element selectively to switch a data bearing medium along a desired one of said track channels; and fluid drive means coupled to said transport means for propelling said media along said track channels, whereby data from selected data bearing media is retrieved.

References Cited by the Examiner

UNITED STATES PATENTS

| | | | |
|---|---|---|---|
| 541,757 | 6/95 | Johnson | 243—29 |
| 696,305 | 3/02 | Bemis | 243—29 |
| 1,067,591 | 7/13 | Degener | 199—40 |
| 1,745,786 | 2/30 | Drenkard | 243—39 |
| 1,928,721 | 10/33 | Field | 199—40 |
| 2,039,016 | 4/36 | McGuiness | 209—111.5 X |
| 2,523,109 | 9/50 | Frolander et al. | 199—41 |
| 2,634,911 | 4/53 | Wolowitz. | |
| 2,692,729 | 10/54 | Guttridge | 235—61.11 |
| 2,792,997 | 5/57 | Affelder | 243—34 |
| 2,842,362 | 7/58 | Hayes | 271—3 |
| 2,956,800 | 10/60 | Gray | 271—5 |
| 3,022,941 | 2/62 | Baumbach | 235—61.11 |
| 3,096,882 | 7/63 | Tyler | 209—111.5 |

SAMUEL F. COLEMAN, *Acting Primary Examiner.*

ROBERT C. RIORDON, RAPHAEL M. LUPO, *Examiners.*